Jan. 15, 1957  G. L. COLSON  2,777,685
CUTTING TORCH GUIDE
Filed Jan. 8, 1953  2 Sheets-Sheet 1

Glenn L. Colson
INVENTOR.

BY *Clarence A. O'Brien*
*and Harvey B. Jackson*
Attorneys

Jan. 15, 1957 G. L. COLSON 2,777,685
CUTTING TORCH GUIDE
Filed Jan. 8, 1953 2 Sheets-Sheet 2
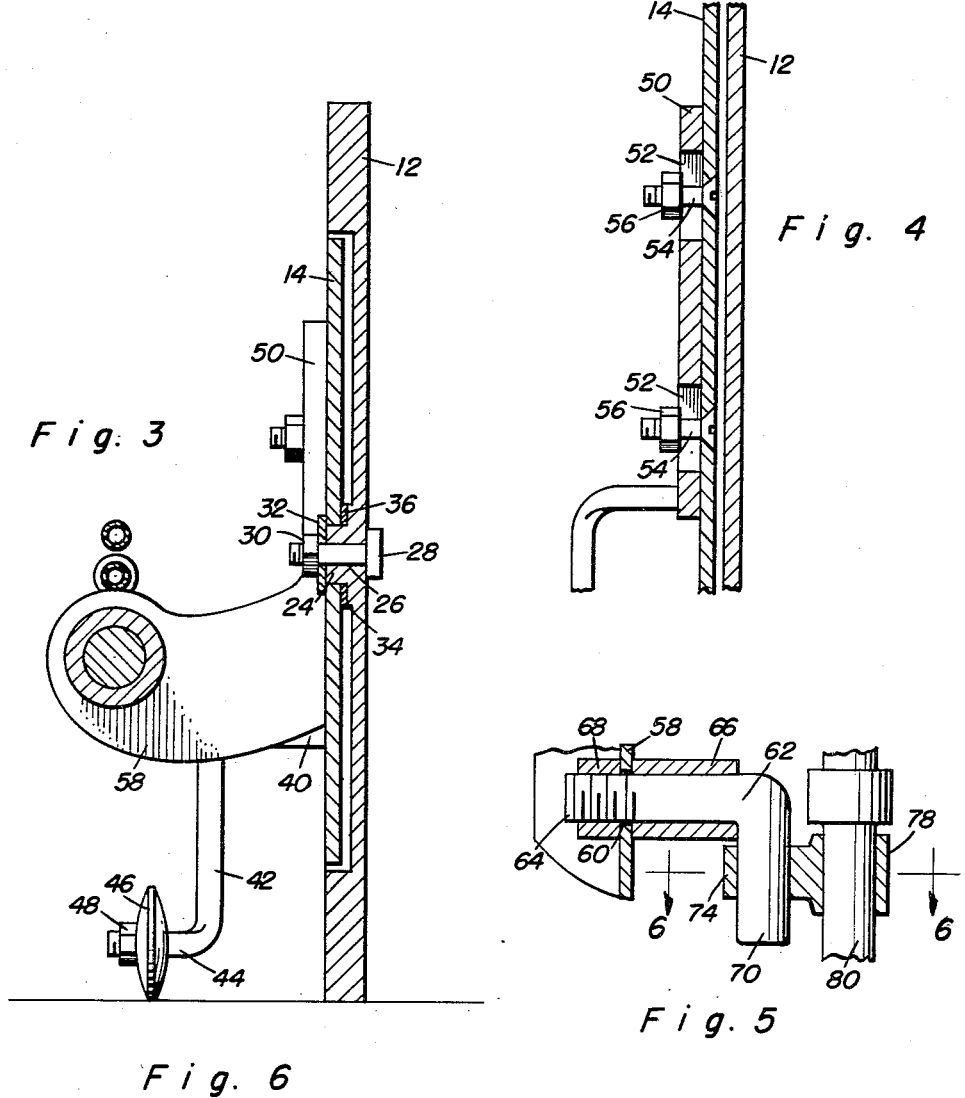
Glenn L. Colson
INVENTOR.
BY 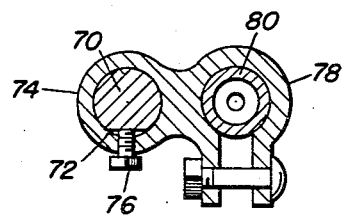
Attorneys

United States Patent Office 2,777,685
Patented Jan. 15, 1957

2,777,685

CUTTING TORCH GUIDE

Glenn L. Colson, Lawrence, Kans.

Application January 8, 1953, Serial No. 330,312

6 Claims. (Cl. 266—23)

The present invention relates to a device for guiding the cutting tip or burner tip of a hand torch to produce a smooth, even cut in the metal being severed.

Free hand cutting with a metal fusing torch results in a very rough, uneven edge which requires much filing or grinding to obtain a smooth surface. To eliminate these rough, uneven edges, it has been the practice to use movable rests which are laid on the metal as the torch cuts the same. However, these require constant and frequent moving necessitating loss of time and causing extra rough spots in the cutting by virtue of the necessity for intermittently moving the torch. Rolling guide attachments have been attempted before in the art but have met with little success because of their bulk, heavy weight, limited adjustability and other factors.

Primarily, it is the object of this invention to provide a cutting torch guide of the rolling type that is extremely light in weight, capable of utility on both flat and rounded surfaces, which is extremely stable in operation and which permits both vertical and angular adjustment of the cutting torch tip.

Another object of the invention, ancillary to the preceding object is the provision of a novel disc arrangement on which the cutting tip support or carriage is mounted as well as a novel clamping means for securing the cutting tip of the torch to the carriage.

These, together with various ancillary objects and features which will later become apparent as the following description proceeds are attained by this invention, a preferred embodiment of which is shown by way of example only in the accompanying drawings wherein:

Figure 3 is a front sectional view of the guide taken substantially along section line 3—3 of Figure 2;

Figure 4 is a detail sectional view of the support or carriage mounting taken substantially along section line 4—4 of Figure 2;

Figure 5 is a sectional view of the clamping means taken substantially along section line 5—5 of Figure 2; and Figure 6 is a top sectional view of the clamping means taken substantially along section line 6—6 of Figure 5.

Referring now to the accompanying drawings in detail, it will be noted that like reference numerals are utilized to designate similar parts throughout the various views.

Figure 1:
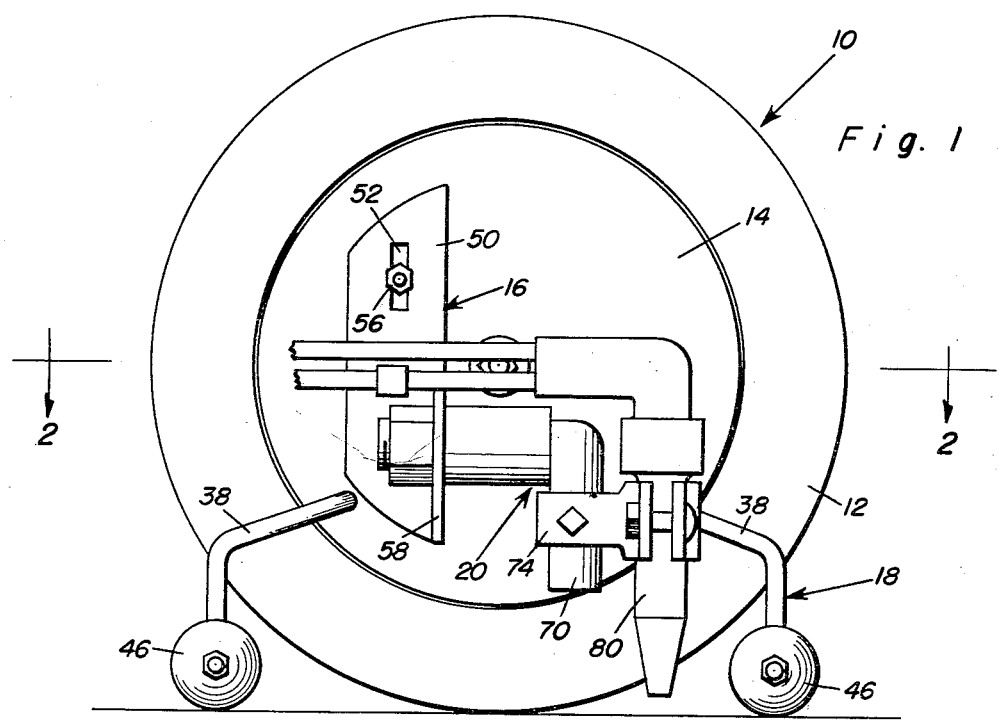
Figure 1 is a side elevational view of the torch guide with a burner tip attached thereto in operative position.

Referring first to Figure 1, the cutting torch guide is indicated generally by the numeral 10 and consists generally of a rolling disc or wheel 12, a stationary member as disc or wheel 14 upon which is mounted the cutting torch support or carriage 16 and a stabilizing wheel assembly 18, which is also secured to the stationary disc 14. Clamping means 20 for the burner tip of the torch is secured to the support 16.

Figure 2:
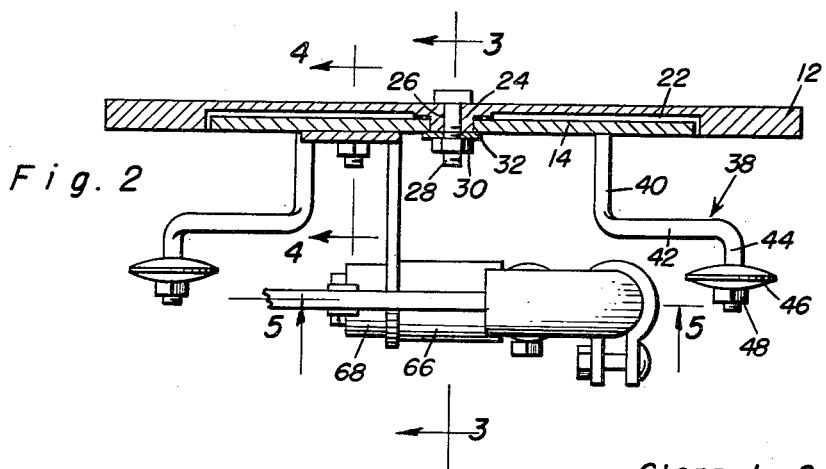
Figure 2 is a top sectional view taken substantially along section line 2—2 of Figure 1.

Noting Figures 2 and 3, it will be seen that the rolling disc 12 is provided with a central recessed portion 22 with an integral hub 24 extending axially into the recess and terminating flush with the inner face of the rolling disc 12. The stationary disc 14 is disposed in the recess portion 22 of the rolling disc 12 and is journaled on the hub 24. The inner face of the stationary disc 14 terminates flush with the inner face of the rolling disc 12. An axial bore 26 extends through the hub 24 and a headed fastener 28 extends through this bore and is provided with a suitable nut and washer 30 and 32 respectively to retain the stationary disc 14 on the hub 24. A raised boss 34 is provided on the rolling disc 12 surrounding the hub 24 and antifriction means 36 is disposed between the boss and the stationary disc 14.

The stabilizer wheel assembly 18 consists of a pair of axles secured to the lower portion of the stationary disc 14 on opposite sides of the center thereof. Each axle 38 has a first portion 40 extending at right angles to the face of the stationary disc 14 and a second downwardly inclined portion extending parallel to the faces of the discs and finally a stub portion 44 extending in the same direction as the first portion 40 but laterally offset therefrom upon which the stabilizing wheels 46 are journaled. Nuts 48 threaded on the ends of the stub portions 44 maintain the stabilizing wheels 46 thereon. With this arrangement, the stabilizing wheels are laterally offset from and disposed at opposite sides of the center of the rolling disc 12 to provide a three point suspension for the guide and to additionally maintain the stationary disc 14 against rotation upon rolling of the rolling disc 12.

The support or carriage 16 for the burner tip comprises a vertically disposed, elongated flat plate 50 which is adjustably mounted on the stationary disc 14. To provide this adjustable mounting, the plate 50 is provided with a pair of longitudinally spaced slots 52 through which fasteners 54 mounted on the stationary disc 14 extend. Nuts 56 threaded on the fasteners 54 clamp the plate 50 in selected vertically adjusted positions on the disc 14. On the lower portion of the plate 50 and extending substantially at right angles to the plate 50 is a support arm 58.

As will be noted, the arm 58 is in the form of a horizontally extending, vertically disposed flat plate through the free end of which is a bore 60 (note Figure 5).

An L-shaped clamping bar or rod has a first leg 62 extending through the aperture 60, which leg is provided with a threaded free end portion 64. Loosely received on the leg 62 on one side of the arm 58 is a spacing sleeve 66 while a nut 68 is threaded on the free end portion 64 of the sleeve on the other side of the arm 58. Preferably, the leg 62 extends loosely through the aperture 60 and the tightening of the nut 68 clamps the leg 62 against rotational movement with respect to the arm 58. The other leg 70 of the L-shaped clamping bar constitutes a clamp shank. As shown in Figure 6, the shank 70 is provided with a flattened portion 72 and a ring clamp 74 is received on the shank and has a set screw 76 threaded into abutting engagement with the flattened portion 72 to prevent rotation of the clamp on the shank. The clamping portion 78 of the ring clamp embraces and adjustably clamps the burner tip thereto.

In the operation of the device, a burner tip indicated by the numeral 80 is clamped to the clamping ring portion 78 and the L-shaped clamping bar is adjusted by means of the nut 68 to extend at the properly desired angle for the burning tip to cut. The nuts 56 are then loosened and the plate 50 vertically adjusted to appropriately space the torch tip 80 from the work surface. When the proper height of the torch tip is attained, the nuts 56 are then tightened and the cutting operation may begin.

To carry out the cutting operation, the rolling disc 12 is rolled with one hand along the work surface while the torch is held and operated by the other hand of the operator. The guide need never be stopped while the torch is in the cut and the torch flame may be kept in steady contact with the metal. When it is desired to remove the torch from the guide, this may be simply accomplished by loosening the clamping screw of the clamping portion 78 and removing the torch tip therefrom. Obviously, the attachment of the burner tip 80 is also accomplished by this one screw operation.

Although many materials will suffice in the building of the guide, the preferable material is aluminum and when the guide is so constructed, the weight is slightly over one pound, which when considering the weight of the torch attachment is comparatively negligible. The device has been found to be equally efficient on curved, vertical, angular, horizontal and overhead surfaces.

From the above description, the construction and operation of the device will be apparent to those skilled in the art. However, since numerous modifications and changes will readily occur to those skilled in the art after a consideration of the foregoing specification taken in conjunction with the accompanying drawings, it is not desired to limit the invention to the exact construction shown and described. But, all suitable modifications may be resorted to that fall within the scope of the appended claims.

What is claimed as new is as follows:

1. A burner tip guide comprising a rolling disc having a hub, a stationary disc journaled on said hub, a burner tip support adjustably mounted on said stationary disc, stabilizing wheels for said rolling disc disposed at one side thereof, said support comprising an elongated flat plate having longitudinally spaced slots therein, fasteners extending through said slots and adjustably securing said plate to said stationary disc, an arm extending from said plate at right angles to said disc, and a clamping bar secured to said arm and a clamp on said bar for clamping a burner tip thereto.

2. A burner tip guide comprising a rolling disc having a hub, a stationary disc journaled on said hub, a burner tip support adjustably mounted on said stationary disc, stabilizing wheels for said rolling disc disposed at one side thereof, said support comprising an elongated flat plate having longitudinally spaced slots therein, fasteners extending through said slots and adjustably securing said plate to said stationary disc, an arm extending from said plate at right angles to said disc, a clamping bar secured to said arm and a clamp on said bar for clamping a burner tip thereto, said clamping bar comprising an L-shaped member, one leg of said member being rotatively received in said arm, and means securing said one leg in selected rotated positions on said arm, the other leg of said member constituting a guide shank, said clamp being mounted on said shank.

3. A burner tip guide comprising a rolling disc having a hub, a stationary disc journaled on said hub, a burner tip support adjustably mounted on said stationary disc, stabilizing wheels for said rolling disc disposed at one side thereof, said support comprising an elongated flat plate having longitudinally spaced slots therein, fasteners extending through said slots and adjustably securing said plate to said stationary disc, an arm extending from said plate at right angles to said disc, a clamping bar secured to said arm and a clamp on said bar for clamping a burner tip thereto, and axles secured to said stationary disc on opposite sides of said support, said stabilizing wheels being journaled on said axles in laterally offset relation to said discs.

4. A cutting tip guide comprising a rolling disc having a central recessed portion and a hub extending into said recessed portion, a stationary disc journaled on said hub, the face of said stationary disc terminating flush with said rolling disc, a burner tip support adjustably mounted on said stationary disc, steadying wheels suspended from said stationary disc, said wheels being disposed at one side of said rolling disc, said support comprising an elongated flat plate having longitudinally spaced slots therein, fasteners extending through said slots and adjustably securing said plate to said stationary disc, an arm extending from said plate at right angles to said disc, a clamping bar secured to said arm, and a clamp on said bar for clamping a burner tip thereto.

5. A burner tip guide comprising a rolling disc having a hub, a stationary disc journaled on said hub, a burner tip support adjustably mounted on said stationary disc, stabilizing wheels for said rolling disc disposed at one side thereof, said support comprising an elongated flat plate having longitudinally spaced slots therein, fasteners extending through said slots and adjustably securing said plate to said stationary disc, an arm extending from said plate at right angles to said disc, a clamping bar secured to said arm and a clamp on said bar for clamping a burner tip thereto, said clamping bar comprising an L-shaped member, one leg of said member being rotatively received in said arm, means securing said one leg in selected rotated positions on said arm, the other leg of said member constituting a guide shank, said clamp being mounted on said shank, said securing means comprising a spacing sleeve on said one leg abutting one face of said arm, and a nut threaded on the free end of said one leg abutting the opposite face of said arm.

6. A burner tip guide comprising a rolling disc, a hub at the axis of rotation of said rolling disc, a stationary member rotatably connected to said hub, a burner tip support, means adjustably connecting said burner tip support to said stationary member, and stabilizing means for said rolling disc located on at least one side thereof.

References Cited in the file of this patent

UNITED STATES PATENTS

| | | |
|---|---|---|
| 458,182 | Merrifield | Aug. 25, 1891 |
| 1,317,425 | Bryce | Sept. 30, 1919 |
| 1,323,511 | Welch | Dec. 2, 1919 |
| 1,459,608 | Allen | June 19, 1923 |
| 1,915,886 | Gutierrez | June 27, 1933 |
| 2,283,347 | Young | May 19, 1942 |
| 2,341,751 | Willoughby | Feb. 15, 1944 |
| 2,525,241 | Rentsch | Oct. 10, 1950 |